Patented May 22, 1951

2,553,956

UNITED STATES PATENT OFFICE 2,553,956

SEPARATION OF GAMMA BENZENE HEXACHLORIDE

Leslie James Burrage, Hunts Cross, and James Crosby Smart, Widnes, England, assignors to Imperial Chemical Industries Limited, a corporation of Great Britain No Drawing. Application January 27, 1948, Serial No. 4,708. In Great Britain June 11, 1943

6 Claims. (Cl. 260—648)

This invention relates to improvements in the production of organic compounds, and more particularly to the isolation of an isomeric form of benzene hexachloride.

This application is a continuation-in-part of our copending application Serial Number 537,372, filed May 25, 1944, now abandoned.

It is known that benzene hexachloride can be obtained by reacting chlorine with benzene under conditions promoting the addition of chlorine, but not the substitution of chlorine for hydrogen. The product so obtained is a mixture of stereoisomers of benzene hexachloride and will be referred to hereinafter as the additive chlorination product of benzene. The additive chlorination product of benzene is suitably prepared by passing chlorine into benzene in the presence of actinic radiation at temperatures of, say, 50° C. to 60° C. A number of stereoisomers of benzene hexachloride are possible in the additive chlorination product of benzene, some of which have been described in the literature, and under the above conditions the alpha isomer, M. P. 158° C. predominates in the product, the beta isomer, M. P. 305° C., and the gamma isomer, M. P. 113° C., also being formed.

Hitherto the gamma isomer has been obtained by continuing the chlorination of the benzene until a slurry of alpha benzene hexachloride is formed which is filtered off, and the other isomers present are obtained from the mother liquor by fractional crystallisation. This mother liquor, of course, is saturated with the alpha isomer, and in addition to the beta and gamma isomers will contain any small amounts of chlorine-substituted benzene hexachloride, for example, monochlorobenzene hexachloride, which may be formed. On fractional crystallisation some of the alpha isomer crystallises with the gamma isomer, making the isolation of the latter difficult and the method troublesome to carry out.

The above-identified application, of which the present application is a continuation-in-part, discloses that the gamma isomer of benzene hexachloride can be recovered from the product obtained by the additive chlorination of benzene by removing unchanged benzene and extracting the remaining material in the cold with a lower aliphatic alcohol. The process is described with particular reference to methanol.

We have found that the alpha isomer has but a small solubility in the lower aliphatic alcohols as compared with the gamma isomer, and in addition this solubility appears to be depressed by the presence of the gamma isomer, so that very little of the alpha isomer dissolves unless more than enough solvent is used to dissolve all of the gamma. Thus a separation of the gamma isomer from the alpha can be achieved. It is, however, preferable in practice to use rather more than this minimum quantity of solvent, since a part of the gamma isomer is liable to be retained with the undissolved alpha isomer, and the additional solvent enables this to be brought into solution. The extract thus obtained, although containing some alpha isomer, will also contain an enhanced proportion of the gamma isomer, and the pure gamma isomer can if desired be obtained therefrom by partial evaporation of the solvent followed by cooling under quiescent conditions. The beta isomer or other bodies present in the additive chlorination product will also be present in the extract containing the gamma isomer, but on crystallisation of the solution as above the gamma isomer is deposited first, and can thus be recovered separately. On the other hand, if the presence of these other bodies is not objectionable, the whole of the solids may be recovered from solution together.

According to the present invention, therefore, a process for treating the additive chlorination product of benzene to obtain therefrom a benzene hexachloride having an enhanced proportion of the gamma isomer comprises extracting the said chlorination product with a lower aliphatic alcohol in such amount as to dissolve gamma isomer and leave a substantial proportion of the alpha isomer undissolved, the weight of the said alcohol not being less than half the weight of the solid to be extracted. The alcohols methanol and ethanol are both particularly suitable for the process of the invention. Where the additive chlorination product of benzene is obtained as a mixture with unchanged benzene the latter is removed by extraction, preferably by flashing off by contacting the mixture with hot water.

The minimum quantity of solvent necessary to carry out the invention will be that which gives a mixture of solution and undissolved material from which it is practicable to separate the former, and this corresponds to approximately equal bulks of solvent and crude benzene hexachloride. Since the respective densities of methanol and ethanol are about half that of benzene hexachloride, on this basis the weight of solvent used would thus be equal to about half the weight of the solid taken. This quantity of solvent, however, is not sufficient to dissolve all the gamma isomer present in the ordinary additive chlorination product of benzene, and the most advantageous amount of solvent will in general be the minimum which will dissolve all the gamma isomer. The latter figure can be approximately calculated by use of the following table showing the relative solubilities of the individual alpha and gamma isomers in methanol and ethanol, given as the number of parts of these isomers present in 100 parts by weight of a saturated solution at 20° C. containing only the one isomer.

| Solvent | Solubility | |
| --- | --- | --- |
| | Alpha | Gamma |
| Methyl alcohol | 2.06 | 6.77 |
| Ethyl alcohol | 1.77 | 6.39 |

When all four isomers are present, the solubility of the gamma is found to be practically the same as for gamma alone, but the solubility of the alpha isomer decreases. From the table, it is seen that 93.23 g. of methanol will dissolve 6.77 g. of gamma isomer, and therefore in a benzene hexachloride containing $y\%$ of gamma, the solvent which would theoretically extract all the gamma isomer present would be $$\frac{93.23y}{6.77} \text{ grams}$$

Crude benzene hexachloride as obtained by the additive chlorination of benzene in presence of actinic light contains about 12% of the gamma isomer, and the least quantity of solvent required to extract all the gamma isomer would therefore be between one and a half and two times the weight of the total solid. In the case of a benzene hexachloride which contains less than 12% gamma, the theoretical amount of solvent required to dissolve all the gamma would also decrease in accordance with the above formula but should not be less than half the weight of solid taken. Subject to the above limitation, however, the proportion of solvent to solid is not extremely critical.

When only sufficient solvent to dissolve all the gamma isomer is used, comparatively little of the alpha isomer goes into solution. If the presence of small amounts of the alpha isomer is not objectionable, however, rather more of the alcohol may be used, and a corresponding proportion of the alpha isomer will then be present in the extract together with the gamma isomer. In practice, the quantity of solvent required is preferably from one to three times the weight of the material to be extracted.

The extraction may conveniently be carried out in the cold, that is to say at temperatures not greatly different from atmospheric, say from 15° C. to 30° C. The recovery of the product from the extract may then be carried out by fractional crystallisation. For instance, the solution may be heated to evaporate part of the alcohol and the concentrated solution allowed to cool to room temperature. Cooling to below atmospheric temperature, for example to —30° C. or —40° C., may be employed to cause crystallisation to occur instead of or in addition to evaporating off the alcohol; and by successive operations of evaporating alcohol and cooling, several fractions can be obtained. Alternatively, if pure gamma isomer is not required the whole of the solids in the extract may be recovered together by evaporating off the alcohol, or by adding water to the extract so that they are precipitated.

When the alcohol is used in amounts such that practically no alpha isomer dissolves, fractional crystallisation will then yield fractions of substantially pure gamma isomer. If the extract contains some alpha isomer, as when the solvent is used in more than minimum quantity, the pure gamma may be obtained by evaporating about two-thirds of the solvent and allowing the remainder of the solution to crystallise while keeping it quiescent. Under these circumstances, although the residue of the solution is supersaturated with the less-soluble alpha isomer the first fraction crystallising out consists of the pure gamma isomer. On the other hand, if after evaporating off part of the solvent the residue is subjected to agitation during cooling, the mixed isomers crystallise in the normal way.

Using methyl or ethyl alcohol, an amount up to an equal weight of the additive chlorination product from which unchanged benzene has been removed can be used to perform the extraction without dissolving any substantial amount of the alpha isomer, and approximately 70% of the alcohol can then be removed from the extract without causing the precipitation on standing of substantial amounts of material other than the gamma isomer. Solvent equal to from one to three times the weight of the additive chlorination product is preferably used to perform the extraction, and a small amount of the alpha isomer then also goes into solution. Removal of about two-thirds of the solvent gives an extract which may be treated in several ways according to the product required. For example, the pure gamma isomer may be obtained by crystallisation under quiescent conditions, the extract may be subjected to normal fractional crystallisation either with agitation or without any special precautions to prevent disturbance of the solution, or the whole of the solvent may be removed to give a gamma concentrate.

The production of the additive chlorination product may be carried out in known manner. For example, chlorine may be passed into benzene at ordinary or elevated temperature while irradiating the benzene with the radiation from a mercury arc lamp, sunlight or other actinic radiation. The introduction of chlorine may be continued until a slurry of benzene hexachloride results, but preferably it is discontinued while all the product is still in solution, since there is then less tendency for chloro-substitution products to form. Conveniently, chlorination is continued until a 15% to 20% solution is obtained.

In one form of the invention benzene is chlorinated while irradiating it with sunlight or the light from a mercury arc lamp by passing in chlorine at such a rate that it is substantially completely absorbed. Suitably the temperature is maintained between 40° C. and 50° C. When the solution formed contains 15% to 20% benzene hexachloride chlorination is stopped, and the solution is added gradually to a large agitated volume of water maintained at 75° C. to 80° C. so that benzene is flashed off and the benzene hexachloride precipitated; the benzene vapour may be condensed, separated from the water which will be condensed with it, and used for further chlorinations. The precipitated benzene hexachloride is filtered off from the water, dried at 30° C. to 35° C., ground, and then treated with between 1 and 3 times its weight of cold methanol with agitation for some time, for example 2-4 hours, and the resultant solution filtered off. After extraction, the filter cake may be washed with additional small portions of solvent, and the extract, or combined extract and washings, is then heated so as to evaporate 40% to 70% of the methanol and allowed to cool, care being taken to avoid agitation of the solution. Crystalline gamma benzene hexachloride is thereby deposited and can be separated by filtration or decantation and dried. Alternatively the whole of the solids in solution may be recovered by pouring the solution into at least three times its volume of water, so that the solids are precipitated; they may then be separated from the liquid by filtration or decantation and dried.

Instead of removing the benzene from the chlorinated material by contacting it with hot water, the benzene may be evaporated off in an externally heated vessel maintained, if desired, under reduced pressure. However, the removal of benzene by means of hot water is a particularly suitable method since efficient removal of the benzene results without submitting the benzene hexachloride to conditions under which partial decomposition to trichlorobenzene could occur, and since the product is obtained in convenient form for handling.

The gamma benzene hexachloride obtained by the methods of this invention may be used in the manufacture of pest control compositions as described in and claimed in one form of the invention of British Patent specification No. 573,689. The alpha benzene hexachloride may, if desired, be used for other purposes, for example the manufacture of trichlorobenzene.

The following examples illustrate but do not limit our invention, all parts being by weight:

Example 1

Chlorine was passed at the rate of 22 parts per hour into benzene maintained at 50° C. and irradiated with a mercury arc lamp. Absorption of chlorine was substantially complete. After 1 hour chlorination was stopped. The resultant solution of benzene hexachloride was gradually added to a large volume of water maintained at 76° C. to 78° C. and the precipitated product was filtered off, dried in a tray drier for 24 hours, and ground.

1000 parts of the ground benzene hexachloride thus obtained were agitated with 2000 parts of methanol in the cold, and the resultant solution was filtered off, heated to evaporate 1220 parts of methanol and then allowed to cool to 16° C. and stand overnight. The crystals which separated were filtered off and dried. 46 parts of the gamma isomer of benzene hexachloride were thus obtained, melting at 110–113° C.

Example 2

370 parts of crude benzene hexachloride prepared as in Example 1 were stirred at 20° C. for 2 hours with 810 parts of industrial alcohol (containing about 95% ethanol and the remainder methanol and other impurities) and the slurry so obtained was filtered under reduced pressure. The filtrate was heated until all the solvent had evaporated. The residue, consisting of 115 parts of solid material, contained 32% of the gamma isomer. The original crude material contained approximately 12% of the gamma isomer.

Example 3

1000 parts of ground benzene hexachloride prepared as in Example 1 were agitated with 2400 parts of industrial alcohol at 20° C. for 2 hours. The solution so obtained was filtered under reduced pressure and the filter cake was pressed to remove as much liquid as possible, and then washed twice with 50 parts of industrial alcohol. The filtrate was heated to distil off 1700 parts of alcohol. The residual extract was allowed to cool to room temperature and to remain quiescent for two days. Crystals of gamma isomer which formed were filtered off, rinsed quickly with a little alcohol and dried at about 50° C. 66 parts of pure gamma isomer were obtained.

We claim:

1. A process for treating the total additive chlorination product of benzene to obtain therefrom a benzene hexachloride product having an enhanced proportion of gamma isomer which comprises extracting said isomer mixture with a cold lower saturated aliphatic monohydric alcohol having not over 2 carbon atoms in such amount as to dissolve only a part of said mixture and leave a substantial portion of said mixture undissolved, the weight of said alcohol being not less than half the weight of said isomer mixture.

2. A process for treating the total additive chlorination product of benzene to obtain therefrom a benzene hexachloride product having an enhanced proportion of gamma isomer which comprises extracting said isomer mixture with cold methanol in such amount as to dissolve only a part of said mixture and leave a substantial portion of said mixture undissolved, the weight of said alcohol being not less than half the weight of said isomer mixture.

3. A process for treating the total additive chlorination product of benzene to obtain therefrom a benzene hexachloride product having an enhanced proportion of gamma isomer which comprises agitating said isomer mixture in the cold with a lower saturated aliphatic monohydric alcohol having not over 2 carbon atoms in such amount as to dissolve only a part of said mixture and leave a substantial portion of said mixture undissolved, the weight of said alcohol being not less than half the weight of said isomer mixture, separating the resulting solution from the undissolved portion of said isomer mixture, causing the said solution to deposit crystals while maintaining it quiescent and separating the precipitated crystals of gamma benzene hexachloride from the supernatant liquor.

4. A process as claimed in claim 3, wherein said alcohol is methanol.

5. A process as claimed in claim 3, wherein said solution is caused to deposit crystals by heating the solution to evaporate off part of the alcohol therefrom and then cooling the concentrated solution.

6. A process for the production of gamma benzene hexachloride which comprises chlorinating benzene under such conditions that additive chlorination occurs and a solution of benzene hexachloride in unchanged benzene is obtained, evaporating unchanged benzene from said solution to yield a solid mixture of benzene hexachloride isomers containing all the isomers formed in said additive chlorination, extracting said solid mixture in the cold with a lower saturated aliphatic monohydric alcohol having not more than two carbon atoms in such amount as to dissolve only a part of said mixture and leave a substantial portion of said mixture undissolved, the weight of said alcohol being not less than half the weight of said isomer mixture, heating the resulting solution to evaporate off a part of the alcohol content thereof, cooling the concentrated extract and separating the resulting precipitated gamma benzene hexachloride from the supernatant liquor.

LESLIE JAMES BURRAGE.
JAMES CROSBY SMART.

REFERENCES CITED

The following references are of record in the file of this patent:

FOREIGN PATENTS

| Number | Country | Date |
|---|---|---|
| 447,058 | Great Britain | May 7, 1936 |
| 573,693 | Great Britain | Dec. 3, 1945 |

OTHER REFERENCES

Van der Linden, "Berichte der Deut. Chem. Gesell.," vol. 45, pages 231–6 (1912).

"Handbook of Chemistry and Physics," 26th ed., pages 724–5 (1942).